United States Patent [19]

Tomita et al.

[11] Patent Number: 5,223,966
[45] Date of Patent: Jun. 29, 1993

[54] METHOD AND APPARATUS FOR OBTAINING MODULATED LIGHT INDICATIVE OF AN IMAGE OPERATIONALLY FORMED BY PROJECTING AN INPUTTED IMAGE ON THE FLAT PLATE OF AN OPTICAL INDUCTION REFLECTIVE INDEX CRYSTAL

[75] Inventors: Yasuo Tomita, Yokohama; Naosato Taniguchi, Machida, both of Japan

[73] Assignee: Canon Kabushiki Kaisha, Tokyo, Japan

[21] Appl. No.: 695,094

[22] Filed: May 3, 1991

[30] Foreign Application Priority Data

May 5, 1990 [JP] Japan .................................. 2-116185
May 8, 1990 [JP] Japan .................................. 2-118378

[51] Int. Cl.⁵ .......................... G02B 5/23; G02F 1/01
[52] U.S. Cl. .................................. 359/108; 359/243; 359/244; 359/248; 359/252; 359/11
[58] Field of Search ............... 359/107, 108, 243, 244, 359/248, 252, 11

[56] References Cited

U.S. PATENT DOCUMENTS

| | | | |
|---|---|---|---|
| 4,632,518 | 12/1986 | Jensen | 359/243 |
| 4,701,030 | 10/1987 | Jewell | 359/243 |
| 4,877,312 | 10/1989 | Huignard et al. | 359/243 |
| 4,921,335 | 5/1990 | Ditman, Jr. | 359/241 |
| 4,930,873 | 6/1990 | Hunter | 359/243 |

FOREIGN PATENT DOCUMENTS 0110225 4/1989 Japan .

OTHER PUBLICATIONS

Fainman et al., "Optical Digital Logic Operations by Two-Beam Coupling in Photorefractive Material", Applied Optics, vol. 25, #10, 15 May 1986, pp. 1598-1603.

MacDonald et al., "Asymmetric Transmission Through A Photorefractive Crystal of Barium Titanate", Optics Communications, vol. 50, #3, 1 Jun. 1984, pp. 146-150.

Marrakchi, "Photorefractive Spatial Light Modulation Based on Enhanced Self-Diffraction in Sillenite Crystals", Optics Letters, vol. 13, #8, Aug. 1988, pp. 654-656.

Optical Engineering, vol. 22, No. 6, Nov./Dec. 1983, pp. 704-711, "Optimal properties of photorefractive materials or optical data processing," Valley et al.

Optics Letters, vol. 10, No. 4, Apr. 1985, pp. 187-189, "Carrier diffusion measurements InSn by the angular dependence of degenerate four-wave mixing," Hagen et al.

*Primary Examiner*—Rolf Hille
*Assistant Examiner*—Mahshid Saadat
*Attorney, Agent, or Firm*—Fitzpatrick, Cella, Harper & Scinto

[57] ABSTRACT

An optical logic operation apparatus includes an optical induction refractive index crystal having first and second planes parallel to each other and a device for inputting a coherent probe light from the first plane of the crystal. At least one of the first light output from the first plane of the crystal and the second light output from the second plane of the crystal is taken out so that one of the first and second lights is amplified by the two-wave coupling of the probe light reflected by the second plane and the probe light inputted from the first plane and the other light is attenuated likewise by the two-wave coupling. The inputted image is projected onto the crystal by use of light incoherent to the probe light. With the incidence of the incoherent light, a gain distribution corresponding to the inputted image is generated in the crystal so as to modulate the first and second lights spatially.

19 Claims, 2 Drawing Sheets

METHOD AND APPARATUS FOR OBTAINING MODULATED LIGHT INDICATIVE OF AN IMAGE OPERATIONALLY FORMED BY PROJECTING AN INPUTTED IMAGE ON THE FLAT PLATE OF AN OPTICAL INDUCTION REFLECTIVE INDEX CRYSTAL

BACKGROUND OF THE INVENTION

1. Field of the Invention

This invention relates to an apparatus for optically effecting the logical operation of an image signal, and in particular to an optical logic operation apparatus suitable for executing logical operations such as NAND, NOT and NOR of a two-dimensional image.

2. Related Background Art

It has heretofore been proposed to use an apparatus in which bistable optical devices utilizing optical bistability are formed in a two-dimensional array, with a view to effecting logical operations of a two-dimensional image at a higher speed than by processing by an electronic computer.

In such a bistable optical device, a nonlinear optical output response characteristic to an optical input is obtained by a construction including a pair of Fabry-Perot resonators in the form of parallel flat plates and a medium having a nonlinear refractive effect therein.

Also, to effect logical operations between images by such a bistable optical device, it is a necessary condition to use an exciton resonance absorbing line of a semiconductor GaAs/AlGaAs of multiplex quantum wall structure having a great tertiary nonlinear optical effect or to use the effect of a variation in the refractive index of ZnS or the like by heat to provide a construction in which those media and a Fabry-Perot resonator of high finesse are combined.

However, the constructions as described above have suffered from the following problems:

(a) The high coherency of the input light with time and the fluctuation of the wavelength used must be minimized;

(b) It is difficult to make a device having a two-dimensionally homogeneous characteristic; and (c) The construction is susceptible to disturbance (particularly temperature); and (d) It is necessary to increase the intensity of the inputted light sufficiently because the variations of the reflective index and others of the medium in the resonator, which follow the increased intensity of the inputted light, are utilized.

On the other hand, there has been proposed in Japanese Patent Laid-Open Application 1-10225 an optical logical operation apparatus which has solved the above-mentioned problems. This apparatus is such that an PR crystal showing the photorefractive effect (PR) is arranged in a ring resonator, and an inputted image is projected onto the crystal. Regarding such PR effect, there is a description in G. C. Valley and M. B. Klein, Opt. Eng. Vol. 22, p. 704 (1983), for example.

SUMMARY OF THE INVENTION

An object of the present invention is to provide an optical logic operation apparatus which is easy to fabricate and is reliable in executing the even with a low-intensity light used for the image projection by making a further improvement of the conventional apparatus using the above-mentioned optical induction index crystal, and to provide an a logic operation method using the above apparatus.

The above-mentioned object of the present invention can be achieved by providing an optical logic operation apparatus comprising:

an optical induction refractive index crystal having first and second planes parallel to each other;

means for inputting a coherent probe light from the first plane of the aforesaid crystal;

means for taking out at least one of the first light output from the first plane of the aforesaid crystal and the second light output from the second plane thereof,, wherein one of the first and second lights is amplified by the two-wave coupling of the probe light reflected by the second plane and the probe, light inputted from the first plane, and the other is attenuated likewise by the two-wave coupling; and means for projecting the inputted image onto the crystal by using an incoherent light to the probe light, and with the incidence of this incoherent light, the gain distribution corresponding to the inputted image being generated in the crystal to modulate the aforesaid first and second lights spatially.

Also, a method for obtaining a modulated light showing the image operated by the above-mentioned apparatus comprises the steps of:

inputting a coherent probe light from the first plane of the aforesaid crystal;

taking out at least one of the first light output from the first plane of the aforesaid crystal and the second light output from the second plane thereof, wherein one of the first second lights is amplified by the two-wave coupling of the prove light reflected by the second plane and the probe light inputted from the first plane, and the other being attenuated likewise by the two-wave coupling; and projecting the inputted image onto the crystal by using an incoherent light against the probe light, and with the incidence of this incoherent light, the gain distribution corresponding to the inputted image being generated in the crystal to modulate the aforesaid first and second light spatially.

Another embodiment of an optical logic operation apparatus according to the present invention comprises:

an optical induction refractive index crystal having first and second planes parallel to each other;

means for inputting a coherent probe light from the first plane of the aforesaid crystal;

mirrors provided in parallel to each other at predetermined intervals facing the second plane of the aforesaid crystal, the aforesaid mirrors constituting a resonator in cooperation with the crystal to reflect the probe light transmitted through the crystal;

means for taking out at least one of the first light output from the first plane of the aforesaid crystal or the second light output from the second plane thereof, wherein the second light is amplified by the two-wave coupling of the probe light reflected by the mirrors and the probe light inputted, from the first plane, and the first light is attenuated likewise by the two-wave coupling; and means for projecting the inputted image onto the crystal by using an incoherent light against the probe light, and with the incidence of this incoherent light, the gain distribution corresponding to the inputted image being generated in the crystal to modulate the aforesaid first and second lights spatially.

A further method for obtaining a modulated light showing the image operated by the apparatus according to the above-mentioned another embodiment of the present invention comprises the steps of:

inputting a coherent probe light from the first plane of the aforesaid crystal, the light transmitted through the crystal being reflected by the mirrors;

taking out at least one of the first light output from the first plane of the aforesaid crystal and the second light output from, the second plane thereof, wherein the second light is amplified by the two-wave coupling of the probe light reflected by the mirrors and the probe light inputted from the first plane, and the first light is attenuated likewise by the two-wave coupling; and projecting the inputted image onto the crystal by using an incoherent light against the probe light, and with the incidence of this incoherent light, the gain distribution corresponding to the inputted image being generated in the crystal to modulate the aforesaid first and second light spatially.

In other words, the present invention is fundamentally constituted to provide an arrangement to intensify the non-reciprocal reflections and transmission characteristics by the two-wave coupling in the PR crystal having the PR effect, i.e., to increase the reflectivity (or transmissivity) in the specific direction of the PR crystal, and to execute the logical operations of the inputted image by controlling the intensity of the two-wave coupling in the PR crystal by using the beam inputted into the PR crystal carrying the image information therewith.

By the utilization of the above-mentioned PR effect, it is possible to obtain efficiently a non-linear optical effect such as the aforesaid two-wave coupling effect by a low power of several mW nonresonantly.

DETAILED DESCRIPTION OF THE PREFERRED EMBODIMENTS

Figure 1:
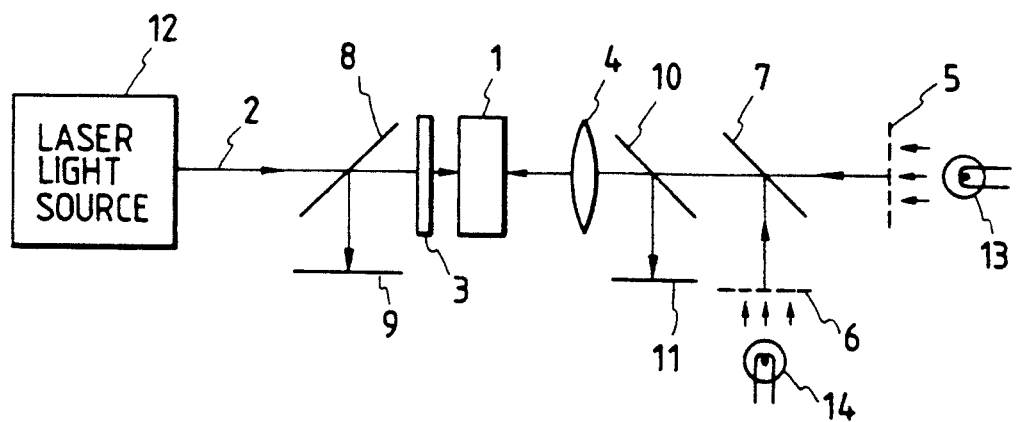
FIG. 1 is a view schematically showing a first embodiment of the optical logic operation apparatus according to the present invention.

FIG. 1 is a view schematically showing a first embodiment of the optical logic operation apparatus according to the present invention. In FIG. 1, a reference numeral 1 designates a PR crystal having the PR effect. The PR crystal 1 is of a flat plate having first and second planes parallel to each other. A numeral 2 designates a coherent probe beam to be incident on the PR crystal 1; 3, a polarization plate; and 4, a lens, respectively. Reference numerals 5 and 6 designate inputted images respectively illuminated by white light in one or two dimensions. Reference numerals 7, 8, and 10 designate means for dividing light such as beam splitters, and 9 and 11, the output planes where the output images are taken out.

Reference numerals 13 and 14 designate the white light sources respectively illuminating the inputted images 5 and 6. Also, a reference numeral 12 designates a laser light source which inputs the coherent light 2 into the crystal 1.

In FIG. 1, the coherent light 2 generated by the laser light source 12 is inputted into the crystal from the first plane of the PR crystal 1 through the means 8 for dividing light and the polarization plate 3. Meanwhile, the images 5 and 6 illuminated by the light sources 13 and 14 are superimposed by the light splitting means 7 and projected onto the PR crystal 1 by the lens 4. In the PR crystal 1, the modulated light by the two-wave coupling corresponding to the inputted image is taken out respectively to the output planes 9 and 11 by the light splitting means 8 and 10.

In the present embodiment, a nonlinear medium having a wide wavelenght sensitivity in the visible region and the near infrared region, such as $BaTiO_3$, bismuth silicon oxide (BSO), strontium barium niobium oxide (SBN), bismuth germanium oxide (BGO), and GaAs, is preferably used as the PR crystal 1. The crystal orientation of this PR crystal 1 is arranged so as to obtain the energy coupling effect between two non-reciplocal beams generated by the two-wave coupling in the PR crystal as mentioned below.

Figure 2:
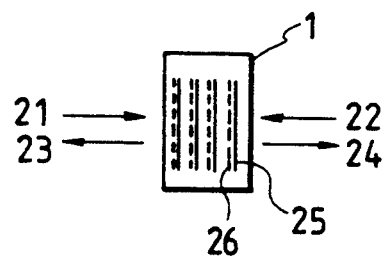
FIG. 2 is a schematic view illustrating the two-wave coupling in the PR crystal.

Here, in accordance with FIG. 2, the optical function of the two-wave coupling is described.

In FIG. 2, reference numerals 21 and 22 designate inputted lights coherent to each other; 23 and 24, reflective lights of those inputted lights, 25, an interference fringe pattern; and 26, a lattice pattern formed by the PR effect for the refractive index. Now, when the beams 21 and 22 of a same intensity are incident on the PR crystal 1, the refractive index lattice 26, i.e., the pattern showing the refractive index variation, is induced by the utilization of the PR effect by the interference fringe 25 formed in the PR crystal 1 by the incident beams 21 and 22.

At this juncture, if the crystal orientation which is dependent on the PR crystal 1 and the direction of polarized light of the incident beams 21 and 22 are arranged appropriately, the incident beams 21 and 22 are affected by the Bragg reflection because of the refractive index lattice 26. In this case, the spatial position or phases of the interference fringe 25 and the refractive index lattice 26 due to the PR effect do not match in general. For example, therefore, the Bragg reflection light of the incident light 21 (or 22) and the transmitted light of the incident light 22 (or 21) are superimposed on each other at the same phase (or opposite phase), and the energy exchange between the two beams 21 and 22 is performed. As a result, the reflection beam 23 is amplified to be an amplified light, and the reflection beams 24 is attenuated to be an attenuated light.

In this case, the direction of the amplified light depends on the crystal orientation of the PR crystal 1. For example, in the case of $BaTiO_3$ being used, if the c axis of the PR crystal 1 is arranged in parallel with the incident beams 21 and 22, i.e., in the horizontal direction in FIG. 2, the amplified beam is a reflected beam in the +c axial direction, and the beam reflected in the −c direction becomes an attenuated light.

The phenomena set forth above represent the two-wave coupling, and there are detailed descriptions of such phenomena with the experimental results thereof in the papers, Optics Communications 50 146 (1984) and Optics Letters 10 187 (1985).

Here, reverting to FIG. 1, the function of the present embodiment will be described. When the incident beam 2 is inputted to the PR crystal 1 through the polarization plate 3 as a linearly polarized light in a given direction, the above-mentioned two-wave coupling is caused between the reflected light of the incident beams 2 (corresponding to either one of the incident beams 21 and 22 in FIG. 2) from the second plane (the right-hand plane in FIG. 1) of the PR crystal 1 and the above-mentioned incident beam 2 (corresponding to the other one of the incident beams 21 and 22). At this juncture, if the two orientations of the crystal axis of the PR crystal 1 are arranged so that the incident beams 2 can be intensively reflected by the two-wave coupling, the intensively reflected light of the incident beams from the PR crystal 1 appears on the output plane 9 as an evenly bright pattern through the means 8 for dividing light. In this respect, in order to increase the reflectivity by such two-wave coupling, a dielectric may be stacked on each side of the PR crystal 1 to increase extremely the transmissivity of the first plane thereof, to which the incident beam 2 is inputted (the left-hand plane in FIG. 1), to intensify the reflectivity of the aforesaid second plane extremely.

Now, let it be assumed that the inputted image 5, which is illuminated by the white light, i.e., the incoherent light against the probe light 2, is formed through lens 4 on the PR crystal 1 which is thus functioning optically by the two-wave coupling. Here, let it be further assumed that this white light is arranged to be in a linearly polarized condition rectangular to the polarized condition of the incident beam 2 in the PR crystal 1. To this end, the means 10 for dividing light should be one having polarization characteristics such as a polarized beam splitter.

In this case, the gain coefficient $\Gamma$ representing the intensity of the above-mentioned reflection light amplified by the two-wave coupling in the PR crystal 1 can be expressed in the equation given below.

$$\Gamma = \Gamma_0/(1 + \eta \cdot \text{Iin}/I_0) \qquad (1)$$

where Iin is the intensity of the above-mentioned white beam; $I_0$ is the intensity of laser light related to the two-wave coupling in the PR crystal 1, i.e., the intensity of the incident light 2; $\eta$ is the sensitivity ratio of the beam having the intensity Iin and the beam 2 having the intensity $I_0$ against the PR effect; and $\Gamma_0$ is a gain coefficient in the condition of Iin=0.

Therefore, in accordance with the equation (1), the gain coefficient $\Gamma$ corresponding to the bright portion of the inputted image 5 becomes small, and the reflectivity of this portion is reduced. Accordingly, on the output plane 9 where the image on the plane of the PR crystal 1 is formed by an appropriate image-formation system, a portion corresponding to this portion becomes dark. On the other hand, the reflectivity of the portion corresponding to the bright portion of the inputted image 5 of the beam of the incident beam 2, which is transmitted through the PR crystal 1, is reduced as described above, and the intensity of the transmitting light is increased. Hence, this transmitting light is effectively reflected through the means 10 for dividing light. This is due to the fact that as described above, the means 10 for dividing light allows the linearly polarized light rectangular to the polarizing condition of the incident beam 2 in the PR crystal 1 to be transmitted, and the transmitting light which is the polarized light rectangular to this linearly polarized light has reflecting polarized light characteristics. Then, the portion corresponding to the above-mentioned portion of the other output plane 11 or the plane of the PR crystal 1, on which the image is formed by an appropriate image-formation system becomes bright. In other words, the output plane 11 outputs the image of with the reverse contrast to the image formed on the output plane 9.

Figures 3A, 3B:
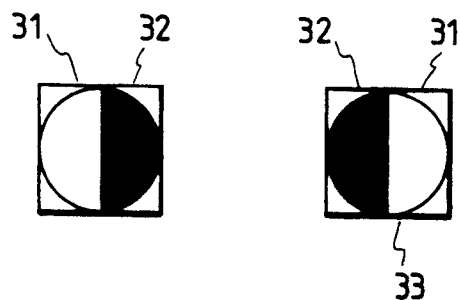
FIG. 3A and FIG. 3B are views respectively showing the examples of the inputted and output images in the apparatus of the present invention.

FIG. 3A and FIG. 3B are views illustrating the operation in the case of the inputted image 5 being a binarized image. FIG. 3A shows a specific example of the inputted image 5 which is divided into the highly contrasted two portions, bright and dark. FIG. 3B shows the result of this inputted image 5 appearing on the output plane 9. In FIG. 3B, a reference numeral 29 designates the bright portion of the inputted image 5; 30, the dark portion of the inputted image 5; 31, the bright portion resulting from the incident beam 2 which is intensively reflected by the PR crystal 1; 32, the dark portion resulting from the reduced reflectivity of the PR crystal 1 caused by the reduction of the two-wave coupling in the PR crystal 1 in accordance with the equation (1); and 33, the boundary thereof.

This result of the operation means that a logical operation of NOT is executable for the inputted image 5.

Likewise, on the other output plane 11, an image having the same bright and dark portions as the inputted image 5 is output after being converted into the laser beam coherent to the incident beam 2.

The above-mentioned result is of course applicable to the case where the inputted image 5 has a continuously analogous transmissivity. In the case of the analogously inputted image, an inverse image of the inputted image 5 is obtained on the output plane 9 with the intensified or weakened contrast by the above-mentioned $\eta$ value and others because the dependability of the intensity Iin of the white light of the gain coefficient $\Gamma$ in the above-mentioned equation (1) is not linear. Likewise, on the other output plane 11, an image having the same bright and dark portions as the inputted image 5 is output with the intensified or weakened contrast after being converted into the laser beam coherent to the incident beam 2.

In the latter case, i.e., by the use of the output example of the output plane 11, it may also be possible to obtain an output of the image 5, the threshold value of which has been processed. In this case, the required threshold value can possibly be defined by controlling the bias point of the dependability Iin of the gain coefficient $\Gamma$ in the equation(1). To this end, an incoherent light independent of the inputted image 5 should be irradiated from the outside evenly on the plane of the PR crystal 1, and the above-mentioned bias point can be controlled by adjusting the intensity of this even irradiation.

Figures 4A, 4B, 4C, 4D:
FIG. 4A and FIG. 4B are views showing the examples of the images inputted into the apparatus of the present invention.
FIG. 4C and FIG. 4D are views respectively showing the NOR output image and NAND output image when the images shown in FIG. 4A and FIG. 4B are inputted into the apparatus of the present invention.

Next, in accordance with FIG. 4A and FIG. 4B, FIG. 4C, and FIG. 4D, the binarizing operation using the inputs from the two inputted images 5 and 6 in FIG. 1 will be described. FIG. 4A is an example of the inputted image 5 shown in FIG. 1. FIG. 4B shows one example of the inputted image 6. FIG. 4C and FIG. 4D show the output images on the output plane 9 from the two inputted images 5 and 6.

As in the case of FIG. 3A and FIG. 3B, let it be assumed that the light intensity Iin of the bright portion of either one of the two inputted images 5 and 6 shown in FIG. 4A and FIG. 4B is established to reduce the gain coefficient Γ in the equation (1) greatly, a reduction of 90%, for example. Then, the output image as shown in FIG. 4C, i.e., an image corresponding to the result of a NOR operation, appears on the output plane 9. On the other hand, if the gain coefficient Γ in the equation (1) is reduced only for the sum Iin of the light intensities of the bright portions of the inputted images 5 and 6 by a 90%, for example, the output image as shown in FIG. 4D, i.e., an image corresponding to the result of an NAND operation, appears on the output plane 9.

Also, on the other output plane 11, an image corresponding to the result of a NOT operation shown in FIG. 4C and FIG. 4D, i.e., the results of an OR operation shown in FIG. 4C and an AND in FIG. 4D, is obtainable if the above-mentioned operation is executed.

In this respect, as described in conjunction with FIG. 3A and FIG. 3B, the above-mentioned operations in FIG. 4A through FIG. 4D are such that the contrast of the related images can be controlled by irradiating another evenly incoherent beam from the outside to the PR crystal 1.

Figure 5:
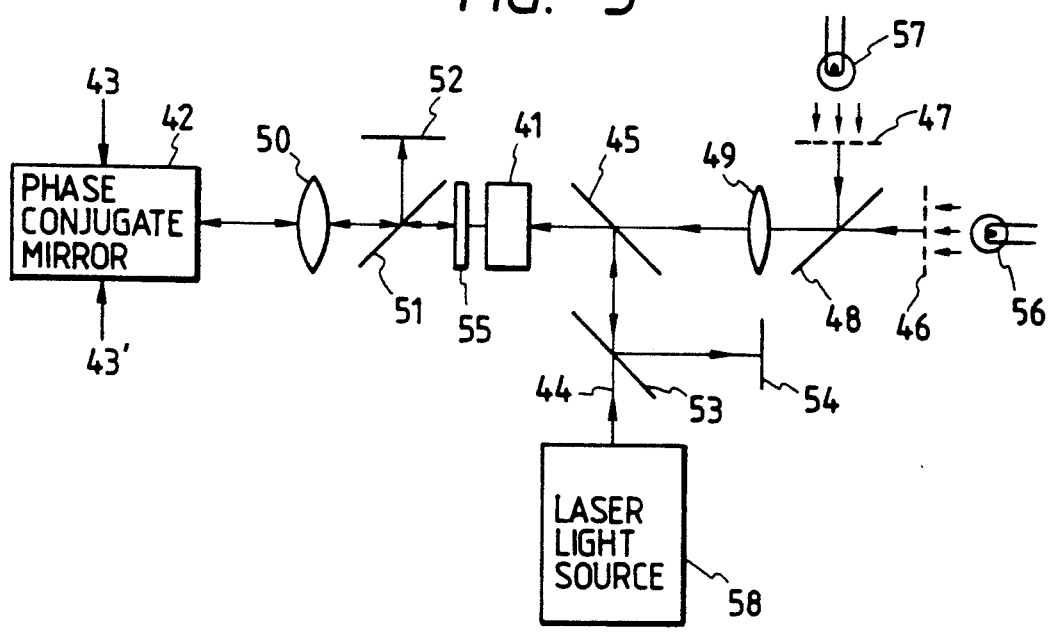
FIG. 5 is a view schematically showing a second embodiment of the optical logic operation apparatus according to the present invention.

FIG. 5 is a view schematically showing a second embodiment of the optical apparatus according to the present invention. In FIG. 5, a reference numeral 41 designates a PR crystal as in the first embodiment. A reference numeral 42 designates a phase conjugate mirror which is designed to make the reflectivity of the phase conjugate mirror 42 100% or more with the supply of the pumping lights 43 and 43 from the outside to materialize a four-wave coupling. The phase conjugate mirror 42 is formed by a nonlinearly optical material, but the material is not necessarily limited to the PR crystal. Some other nonlinearly optical material (an organic material, for example) or the like may also be employed. Further, a reference numeral 44 designates an probe beam inputted into the PR crystal 41; 45, 48, 51, and 53, means for dividing light such as beam splitters and half mirrors; 46 and 47, one- or two-dimensionally input images irradiated by the incoherent light having the wave length which enables the PR crystal 41 to sense; 49, a lens to form the inputted images 46 and 47 on the PR crystal 41; 50, a lens to converge lights onto the phase conjugate mirror 42; 52 and 54, output planes; and 55, a polarizing plate. In this case, the incident beam 44 is assumed to carry the wavelength which induces the PR effect in the PR crystal 41, and further generates the phase conjugate wave in the phase conjugate mirror 42. Also, the crystal orientation of the PR crystal 41 is arranged to obtain the energy coupling effect between the two non-reciprocal beams by the two-wave coupling in the PR crystal set forth below.

Also, reference numerals 56 and 57 designate respectively white light sources illuminating the inputted images 46 and 47. Here, a reference numeral 58 designates a laser light source for inputting the coherent light 44 into the crystal 41.

In the present embodiment, the image operation is also executed by the use of the two-wave coupling described in FIG. 2.

Subsequently, in conjunction with FIG. 5, the function of the present embodiment will be described. The incident beam 44 of the linearly polarized light is inputted into the PR crystal 41 through means 53, 55 for dividing light and after being transmitted therethrough, the beam is inputted into the phase conjugate mirror 42 through the polarizing plate 55 having the same direction as the polarized light orientation of this incident beam 44 and the lens 50.

At this juncture, the time-inversion wave (phase conjugate wave) of the incident beam 44 is generated by the four-wave mixture in the phase conjugate mirror 42. Although this phase conjugate wave is again inputted into the PR crystal 41, the crystal orientation of the PR crystal 41 is arranged to reflect the phase conjugate wave intensively by the above-mentioned two-wave coupling. At this time, the incident beam 44 inputted into the PR crystal 41 from the right-hand side of FIG. 5 corresponds to one the inputted lights 21 and 22 is FIG. 2 which are coherent to each other, and this phase conjugate wave corresponds to the other one of the inputted lights 21 and 22. Then, the phase conjugate light intensively reflected from the PR crystal 41 by the above-mentioned PR effect is again returned to the phase conjugate mirror 42.

Such process is repeated, and resonance is generated by a resonator formed between the PR crystal 41 and the phase conjugate mirror 42 in a normal condition. In this case, for the conditions required for resonance, there are an amplitude condition and a phase condition. As the amplitude condition, it is necessary to provide the gain greater than the loss in one cycle of the resonator in the optical path by making the phase conjugate reflectivity of the phase conjugate mirror 42 greater than 1 (100%).

On the other hand, as the phase condition, it is necessary to make the phase of the resonator in one cycle in the optical path an integral multiple of $2\pi$. According to the present invention, however, the phase condition is automatically satisfied irrespective of the resonator length because the phase conjugate mirror 42 is employed for one of the mirrors forming the resonator. Further, according to the present invention, it is possible to oscillate an arbitrary spatial pattern as the transverse mode of the resonator because the phase conjugate mirror 42 is used as one of the mirrors forming the resonator.

For the aforesaid amplitude condition of the resonator, given the loss of the resonator in one cycle as L, the interrelatedly functional length of the two-wave coupling in the PR crystal 41 as z, the gain coefficient by the two-wave coupling in the PR crystal 41 as Γ, and the phase conjugate reflectivity in the phase conjugate mirror 2 as R, the relationship is established as in the equation given below.

$$\Gamma z \geq -\ln R (1-L) \tag{2}$$

In the equation (2), the gain coefficient Γ is expressed by the aforesaid equation (1) if the incoherent beam is irradiated onto the PR crystal 41 simultaneously.

Therefore, it is seen that in the equation (1), the resonant threshold value provided by the equation (2) oan be controlled by the above-mentioned incoherent beam. The resonant condition at this time is provided by the equation given below based on the equations (1) and (2).

$$\text{Iin} \leq -I_0/\eta \cdot \{1 + z\, \Gamma_0/\ln R (1-L)\} \tag{3}$$

Therefore, in the case where any incoherent beam of a great light intensity which does not satisfy the equation (3) is inputted into the PR crystal 41, the resonance of the resonator is suspended.

By the utilization of the phenomena set forth above, if the inputted image 46 is formed on the PR crystal 41, as shown in FIG. 5, by the lens 49 with the irradiation of the incoherent white light which is the polarized light rectangular to the incident beam 44 accordingly, this light passes through the means 45 for dividing light but not through the polarizing plate 55), the gain coefficient Γ of the two-wave coupling corresponding to the bright portion of the inputted image 46 is reduced in accordance with the equation (1).

In such case, the two-wave coupling in the PR crystal 41 is suppressed in the portion of the PR crystal 41 where the intensity of the irradiated incoherent light does not satisfy the condition of the equation (3), and the resonance in the resonator is suspended. Consequently, the light intensity in the resonator is reduced. At this juncture, if the reflection beam from the means 51 for dividing light is observed by the output image 52, an inverse (negative) image binarized by a certain threshold value for the above-mentioned inputted image 46 is obtainable on the output plane 52.

Further, in the portion of the resonator where the light intensity is reduced, the beam transmits the PR crystal 41 from the left to the right in FIG. 5. Therefore, when the image on the plane of the PR crystal 41 is formed by an appropriate optical system (not shown) through the means 45 for dividing light and the means 53 for dividing light, the inverse image of the result on the output plane 52 is obtained on the other output plane 54.

At this time, it is desirable to use a polarized light beam splitter or the like which has polarized light characteristics as the means 45 for dividing light because, as described above, the polarized light from the inputted image 46 is transmitted but the polarized light of the incident beam 44 is reflected to remove the reflected light from the inputted image 46.

As in the first embodiment, the image operations are also executable for the second embodiment as described in conjunction with FIG. 3A, FIG. 3B and FIG. 4A through FIG. 4D.

Besides the embodiments set forth above, various applications are possible according to the present invention. For example, although descriptions have been given of the case where the inputted image is irradiated by incoherent white light, it may also be possible to use a laser light having the same polarized light condition which is rectangular to the polarized light direction of an LED or probe beam. Also, it may be possible to utilize the laser light of a wavelength different from that of the probe beam within the range of the wavelength which is sensitive to the PR crystal. Here, if the laser light having the polarized light condition, and the probe light, which are rectangular to each other, are used together for the incidence of the inputted image, polarizing light beam splitters are employed as means for dividing light. Also, in the case where the laser light of the wavelength different from the probe light is used for the incidence of the inputted image, those having wavelength selection characteristics are used as means for dividing light. It may also be possible to make the reflectivity of the means for dividing light extremely great against the polarized light condition or wavelength of the probe beam in order to increase the S/N of the operation result on the output plane.

Furthermore, in the above-mentioned embodiments, the two-wave coupling between the probe light beam and the reflected light thereof on the PR crystal is used, but as described in FIG. 2, it may be possible to input the two incoherent beams required for the two-wave coupling independently from both sides of the PR crystal. It is also possible to use any wavelength sensitivity range for the PR crystal appropriately as required.

It is to be understood that the present invention includes all such examples as set forth above without departing from the scope of claims therefor.

What is claimed is;

1. An optical logic operation apparatus comprising:
   an optical induction refractive index crystal having a crystal axis and first and second planes parallel to each other:
   means for causing a coherent and linearly polarized probe light to be perpendicularly incident on the first plane of said crystal, wherein a direction of polarization of said probe light and said crystal axis of said crystal are arranged so that said probe light induces a refractive index lattice in said crystal perpendicular to the incident direction of the probe light and said probe light is Bragg-reflected by said refractive index lattice;
   means for picking up at least one of a first light emitted from said first plane of said crystal and a second light emitted from said second plane of said crystal, wherein one of said first and second lights is amplified by two-wave coupling of said probe light reflected from said second plane and said probe light incident on said first plane, and the other light is attenuated likewise by the two-wave coupling; and
   means for projecting at least one image onto said crystal by an incoherent light incoherent with respect to said probe light, wherein a gain distribution corresponding to the image is produced on the crystal by the incidence of said incoherent light to modulate said first and second lights spatially.

2. An optical logic operation apparatus according to claim 1, wherein said projecting means comprises means for superimposing a plurality of images and projecting the superimposed images onto said crystal.

3. An optical logic operation apparatus according to claim 1, wherein said projecting means comprises means for illuminating the image and a lens for forming the image on the crystal by the light from the image which is illuminated.

4. An optical logic operation apparatus according to claim 1, wherein said means for picking up at least one of said first and second lights comprises a beam splitter for picking up said first light, arranged on an incident light path of said probe light.

5. An optical logic operation apparatus according to claim 1, wherein said means for picking up at least one of said first and second lights comprises a beam splitter for picking up said second light, arranged on an incident light path of the incoherent light.

6. An optical logic operation apparatus according to claim 1, wherein said causing means comprises a light source irradiating a laser light onto said crystal.

7. An optical logic operation apparatus according to claim 1, wherein said apparatus further comprises a polarizing plate arranged on an incident light path of said probe light.

8. An optical logic operation apparatus according to claim 1, wherein said crystal is made of either one of the materials, $BaTiO_3$, bismuth silicon oxide, strontium barium niobium oxide, bismuth germanum oxide, and GaAs.

9. A method for obtaining a modulated light indicative of an image by use of an optical induction refractive index crystal having a crystal axis and first and second planes parallel to each other, said method comprising the steps of:

causing a coherent and linearly polarized probe light to be perpendicularly incident on said first plane of said crystal, wherein a direction of polarization of said probe light and said crystal axis of the crystal are arranged so that said probe light induces a refractive index lattice in said crystal perpendicular to the incident direction of the probe light and said probe light is Bragg-reflected by said refractive index lattice;

picking up at least one of a first light emitted from said first plane of said crystal and a second light emitted from said second plane of the crystal, wherein one of said first and second lights is amplified by two-wave coupling of said probe light reflected by said second plane and said probe light incident on said first plane, and the other light is attenuated likewise by the two-wave coupling; and projecting at least one image onto the crystal by use of an incoherent light incoherent with respect to said probe light, wherein, a gain distribution corresponding to the image is produced on said crystal by the incidence of said incoherent light to modulate said first and second lights spatially.

10. An optical logic operation apparatus comprising:
an optical induction refractive index crystal having a crystal axis and first and second planes parallel to each other;

means for causing a coherent and linearly polarized probe light to be perpendicularly incident on said first plane of said crystal, wherein a direction of polarization of said probe light and said crystal axis of the crystal are arranged so that said probe light induces a refractive index lattice perpendicular to the incident direction of the probe light and said probe light is Bragg-reflected by said refractive index lattice;

mirrors provided in parallel to each other at a predetermined spacing to face said second plane of said crystal, said mirrors constituting a resonator in cooperation with said crystal to reflect said probe light transmitted through the crystal;

means for picking up at least one of a first light emitted from said first plane of said crystal and a second light emitted from said second plane of said crystal, wherein sad second light is amplified by two-wave coupling of said probe light reflected by the mirrors and said probe light incident on said first plane, and said first light is attenuated likewise by the two-wave coupling; and means for projecting at least one image onto said crystal by use of an incoherent light incoherent with respect to said probe light, wherein a gain distribution corresponding to the image is produced on said crystal by the incidence of sad incoherent light to modulate said first light and second light spatially.

11. An optical logic operation apparatus according to claim 10, wherein one of said mirrors comprises a phase conjugate mirror.

12. An optical logic operation apparatus according to claim 10, wherein said projecting means comprises means for superimposing a plurality of images and projecting the superimposed images onto said crystal.

13. An optical logic operation apparatus according to claim 10, wherein said projecting means comprises means for illuminating the image and a lens for forming the image on said crystal by the light from the image which is illuminated.

14. An optical logic operation apparatus according to claim 10, wherein said means for picking up at least one of said first and second lights comprises a beam splitter for picking up said second light, arranged in the resonator.

15. An optical logic operation apparatus according to claim 10, wherein said means for picking up at least one of sad first light and second lights comprises a beam splitter, arranged on an incident light path of said probe light.

16. An optical logic operation apparatus according to claim 10, wherein said causing means comprises a light source irradiating a laser light onto said crystal.

17. An optical logic operation apparatus according to claim 10, wherein said apparatus further comprises a polarizing plate arranged in said resonator.

18. An optical logic operation apparatus according to claim 10, wherein said crystal is made of either one of the materials, $BaTiO_3$, bismuth silicon oxide, strontium barium niobium oxide, bismuth germanum oxide, and GaAs.

19. A method for obtaining a modulated light indicative of an image by use of an optical induction refractive index crystal having a crystal axis and first and second planes parallel to each other, and mirrors arranged in parallel to each other at a predetermined spacing to face said second plane of crystal and to constitute a resonator in cooperation with said crystal, said method comprising the steps of:

causing a coherent and linearly polarized probe light to be perpendicularly incident on said first plane of said crystal, wherein the light transmitted through the crystal is reflected by the mirrors, and wherein a direction of polarization of said probe light and said crystal axis of said crystal are arranged so that said probe light induces a refractive index lattice in said crystal perpendicular to the incident direction of the probe light and said probe light is Bragg-reflected by said refractive index lattice;

picking up at least one of a first light emitted form said first plane of said crystal and a second light emitted from a second plane of said crystal, wherein sad second light is amplified by two-wave coupling of said probe light reflected by the mirrors and said probe light incident on said first plane, and said first light is attenuated likewise by the two-wave coupling; and projecting at least one image onto said crystal by use of an incoherent light incoherent with respect to said probe light, wherein a gain distribution corresponding to the image is produced on said crystal by the incidence of said incoherent light to modulate said first and second lights spatially.

* * * * *

UNITED STATES PATENT AND TRADEMARK OFFICE
CERTIFICATE OF CORRECTION

PATENT NO. : 5,223,966
DATED : June 29, 1993
INVENTOR(S) : YASUO TOMITA ET AL.        Page 1 of 3

It is certified that error appears in the above-identified patent and that said Letters Patent is hereby corrected as shown below:

COLUMN 1

Line 31, "wall" should read --well--.
Line 55, "an" should read --a--.
Line 65, "the" should read --the operation--.

COLUMN 2

Line 12, "thereof,," should read --thereof,--.
Line 15, "probe," should read --probe--.
Line 33, "prove" should read --probe--.
Line 60, "inputted," should read --inputted--.

COLUMN 3

Line 10, "from," should read --from--.

COLUMN 4

Line 28, "non-reciplocal" should read --non-reciprocal--.
Line 49, "Bragg reflection" should read --Bragg-reflection--.
Line 53, "Bragg reflection" should read --Bragg-reflection--.

COLUMN 6

Line 8, "or" should read --of--.
Line 11, "of" should be deleted.

UNITED STATES PATENT AND TRADEMARK OFFICE
CERTIFICATE OF CORRECTION

PATENT NO. : 5,223,966
DATED : June 29, 1993
INVENTOR(S) : YASUO TOMITA ET AL.      Page 2 of 3

It is certified that error appears in the above-identified patent and that said Letters Patent is hereby corrected as shown below:

COLUMN 7

Line 29, "optical" should read
--optical logic operation--.
Line 35, "and 43" should read --and 43'--.

COLUMN 8

Line 60, "oan" should read --can--.

COLUMN 10

Line 12, "is;" should read --is:--.

COLUMN 11

Line 1, "germanum" should read --germanium--.
Line 28, "wherein," should read --wherein--.
Line 54, "sad" should read --said--.
Line 64, "sad" should read --said--.

UNITED STATES PATENT AND TRADEMARK OFFICE
CERTIFICATE OF CORRECTION

PATENT NO. : 5,223,966
DATED : June 29, 1993
INVENTOR(S) : YASUO TOMITA ET AL.

It is certified that error appears in the above-identified patent and that said Letters Patent is hereby corrected as shown below:

COLUMN 12

Line 20, "light" should be deleted and "sad" should read --said--.
Line 32, "germanum" should read --germanium--.
Line 52, "form" should read --from--.

Signed and Sealed this

Twenty-sixth Day of April, 1994

Attest:

BRUCE LEHMAN

Attesting Officer

Commissioner of Patents and Trademarks